(12) United States Patent
Sakata et al.

(10) Patent No.: US 6,413,472 B1
(45) Date of Patent: Jul. 2, 2002

(54) METHOD OF MANUFACTURING SCREWS

(75) Inventors: Masaaki Sakata, Matsumoto; Junichi Hayashi, Okaya, both of (JP)

(73) Assignee: Injex Corporation (JP)

( * ) Notice: Subject to any disclaimer, the term of this patent is extended or adjusted under 35 U.S.C. 154(b) by 0 days.

(21) Appl. No.: 09/638,814

(22) Filed: Aug. 14, 2000

(30) Foreign Application Priority Data

Aug. 12, 1999 (JP) .............................. 11-228736

(51) Int. Cl.⁷ .............................. B22F 3/20; B22F 3/24; B22F 5/06
(52) U.S. Cl. .............................. 419/28; 419/41; 419/44; 419/55
(58) Field of Search .............................. 419/28, 41, 44, 419/55

(56) References Cited

U.S. PATENT DOCUMENTS 3,683,436 A * 8/1972 Reiland
4,301,563 A * 11/1981 Deveney, Jr.

* cited by examiner

*Primary Examiner*—Ngoclan Mai
(74) *Attorney, Agent, or Firm*—Harness, Dickey & Pierce, P.L.C.

(57) ABSTRACT

A method of manufacturing screws which can form screws each having a desired hollow axial bore easily and having excellent machinability is provided. The method comprises the steps of (A) producing a green body containing metal powder by means of extrusion molding; (B) debinding the green body to obtain a brown body; and (C) sintering the brown body to obtain a sintered compact, wherein at least one machine working including a thread cutting process is carried out at anytime after the completion of the step (A). The step (C) of this method may include a pre-sintering step for obtaining a pre-sintered compact and a secondary sintering process, and the machining process including a thread cutting process is carried out onto the pre-sintered compact after the completion of the pre-sintering step.

11 Claims, 5 Drawing Sheets

METHOD OF MANUFACTURING SCREWS

BACKGROUND OF THE INVENTION

1. Field of the Invention

This invention relates to a method of manufacturing screws.

2. Description of the Prior Art

Screws which are used inside semiconductor manufacturing apparatuses are put in high vacuum atmosphere. Therefore, if air remains between tip portions of the screws and mated female threads formed in the apparatus when the screws have been fastened, there is a problem in that the remaining air leaks into the inside space of the apparatus which is being kept in a predetermined vacuum condition, thereby lowering the degree of the vacuum.

As for the method for solving this problem, there is known a method that uses a screw having a hollow axial bore extending along its longitudinal direction to evacuate the remaining air at the tip portion thereof through the hollow axial bore.

Normally, the hollow axial bore of the screw is formed by means of drilling or electrical discharge machining.

In the case where a small diameter bore is to be formed by the drilling, a drill having a small diameter corresponding to the diameter of the bore is required. However, since the drilling process requires large power, use of such a small diameter drill involves problems in its strength and durability. In particular, when a long bore is to be formed, an elongated small diameter drill is used. Such an elongated small diameter drill is liable to be broken due to its elongated shape, and it is also liable to be damaged since large vibration likely to occur during the drilling process.

On the other hand, the method using the electrical discharge machining has an advantage in that it is possible to form such a small diameter bore relatively easily as compared with other methods. However, there is a problem in that a machining cost is high, thus leading to increased price of the screw. Further, it is difficult for the method using the electrical discharge machining to form an elongated bore.

Moreover, when a screw is formed of a material which is difficult to be machined, there is a case that such a screw can not be machined by these methods or a case that it takes a relatively long time to machine it.

As stated in the above, the conventional screw manufacturing methods involve problems in that the size of the diameter of a hollow axial bore is limited and in that materials which can be used for manufacturing screws are also limited.

SUMMARY OF THE INVENTION

It is therefore an object of the present invention to provide a method of manufacturing screws by which screws having a hollow axial bore having a predetermined diameter can be formed easily with excellent machinability.

In order to achieve the object, the present invention is directed to a method of manufacturing screws which comprises the steps of: (A) producing a rod-shaped green body having a hollow axial bore from a feed stock containing material powder by means of extrusion molding; (B) debinding the green body to obtain a brown body; and (C) sintering the brown body to obtain a sintered compact, wherein at least one machine working including a thread cutting process is carried out at anytime after the completion of the step (A).

According to the screw manufacturing method described above, it is possible to manufacture screws having a hollow axial bore with excellent machinability and productivity as well as high dimensional precision. Further, it becomes possible to manufacture screws having complex shapes and provide screws formed of hard materials that were difficult to be machined by the conventional methods.

Preferably, the machine working is carried out between the step (A) and the step (B) onto the green body obtained in the step (A). In this case, since the machine working is carried out for the green body which is not hard as compared with the finally obtained sintered compact, it is possible to carry out the machine working easily (that is, the machine working can be carried out with good machinability) regardless the composition of the material powder and the kind thereof. Therefore, control of shape and size can be made easily, thereby enabling to improve dimensional precision at the processing portions and machine complex and intricate shapes.

Further, it is also preferred that the machine working is carried out between the step (B) and the step (C) onto the brown body obtained in the step (B). In this case, as is the same as the above case, since the machine working is carried out for the brown body which is not so hard as compared with the finally obtained sintered compact, it is possible to carry out the machine working easily (that is, the machine working can be carried out with good machinability) regardless the composition of the material powder and the kind thereof. Therefore, control of shape and size can be made easily, thereby enabling to improve dimensional precision at the processing portions and machine complex and intricate shapes.

Furthermore, in the present invention, the machine working may be carried out onto the sintered compact obtained in the step (C) after the completion of the step (C). When the machine working is carried out onto such a sintered compact, less changes occur in shape and dimension of the sintered compact during the machine working as compared with the case where machine working is carried out onto a green body or a brown body. In particular, dimensional deviation at the thread portion becomes extremely small, thereby improving dimensional precision.

Moreover, in the present invention, the step (C) can be carried out by diving the step into a plurality of sintering steps. This improves sintering efficiency so as to accomplish the sintering in a shorter time, thereby enabling to improve producticity.

In this case, it is preferred that the plurality of sintering steps includes a step of obtaining a pre-sintered compact by pre-sintering the brown body and a step of obtaining a secondary sintered compact by sintering the pre-sintered compact, in which the machine working is carried out onto the pre-sintered compact. The pre-sintered compact is not so hard as compared with the sintered compact, it is possible to perform the machine working thereon without difficulty (that is, under good machinability) regardless the composition of the powder material and the kind thereof. Accordingly, it is easy to control the shape and size when manufacturing a screw, thereby enabling to improve dimensional precision at the machining portions and to machine complex and intricate shapes. Further, as compared with the case where a green body or a brown body is machined, since the pre-sintered compact has undergone the pre-sintering process, less changes occur in shape and size during the machine working, thus leading to quite small dimensional deviation in the thread portions, thereby improving dimensional precision.

Further, in the present invention, it is preferred that the diameter of the hollow axial bore after the completion of the sintering step is equal to or less than 1.5 mm. This range of the bore prevents the thickness of the shank and tip portions of the screw from being too thin even if the screw is a small diameter screw, thereby ensuring sufficient strength.

Further, in the present invention, it is also preferred that the extrusion pressure of the extrusion molding is equal to or less than 1000 kgf/cm². This range of the extrusion pressure does not give excessively large load by high temperature and pressure to the extrusion molding machine, thereby enabling to carry out the molding without any trouble.

In the present invention, the material powder is metal powder or ceramics powder. By using these materials, it is possible to obtain screws having heat resistance property and corrosion resistance property.

Further, in the present invention, it is preferred that the porosity of the sintered compact finally obtained is less than 7%. The sintered compact having the porosity of this range has high density, high strength and high dimensional precision, so that not only sintering flaws can be prevented but also good appearance can be obtained. Further, sintering can be carried out effectively to complete the sintering in a shorter time, thereby improving productivity.

Furthermore, the screws manufactured by the method of this invention are preferably used under reduced pressure or vacuum. When the screws are used in such atmosphere, air can be evacuated from the hollow axial bore, so that the degree of vacuum in the chamber in which the screws are being used can be satisfactorily maintained. Therefore, the screws manufactured by the method of this invention are suitably used in chambers of semiconductor manufacturing apparatuses, vacuum deposition apparatuses and spattering apparatuses and the like.

The above described and other objects, structures and advantages of the present invention will be apparent when the following detailed description of the preferred embodiment is considered taken in conjunction with the appended drawings.

DETAILED DESCRIPTION OF THE PREFERRED EMBODIMENTS

Hereinbelow, a detailed description of the preferred embodiments of the screw manufacturing method according to the present invention will be made.

Figure 1:
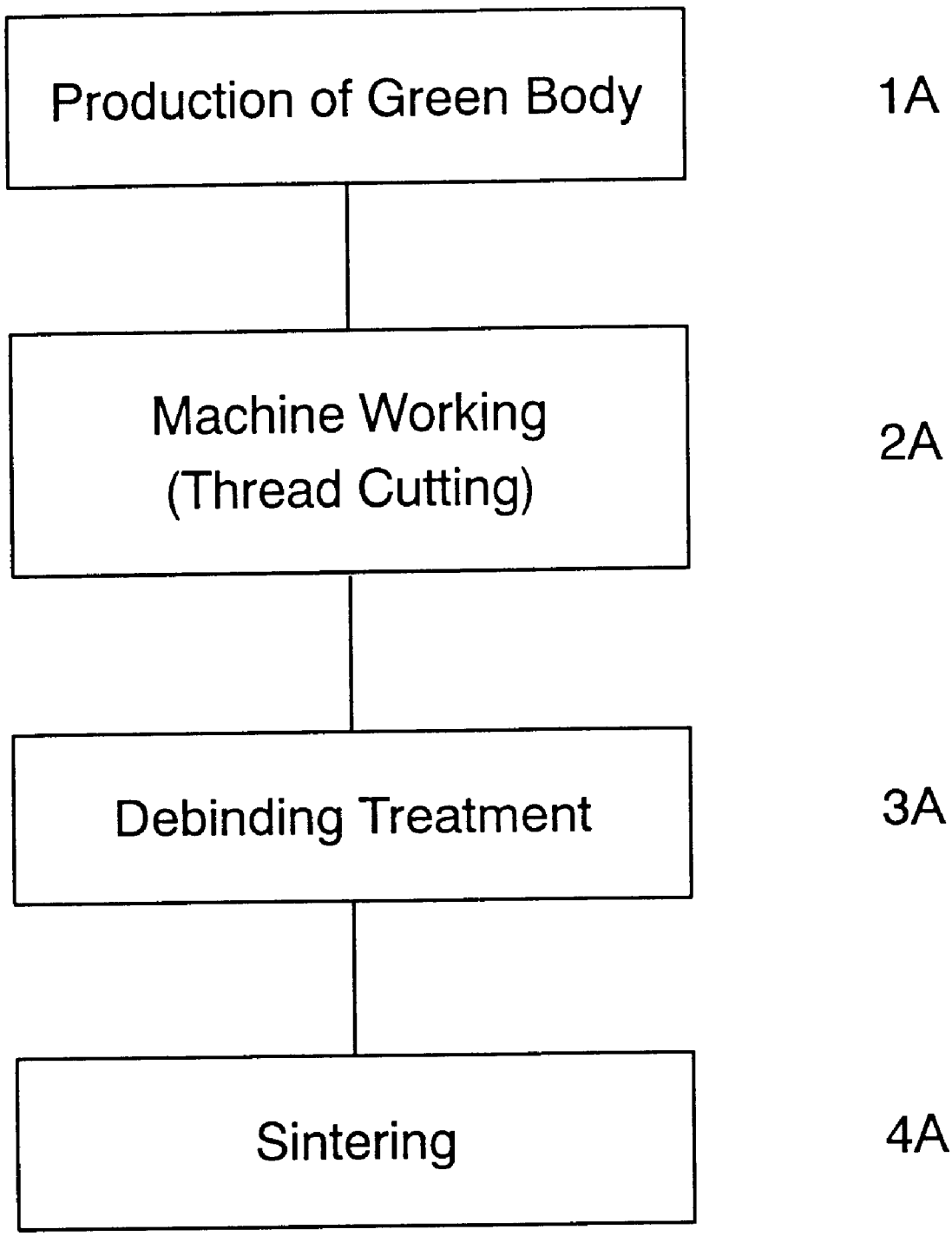
FIG. 1 is a step diagram which shows the steps performed in a first embodiment of a method of manufacturing screws according to the present invention.
Figure 5:
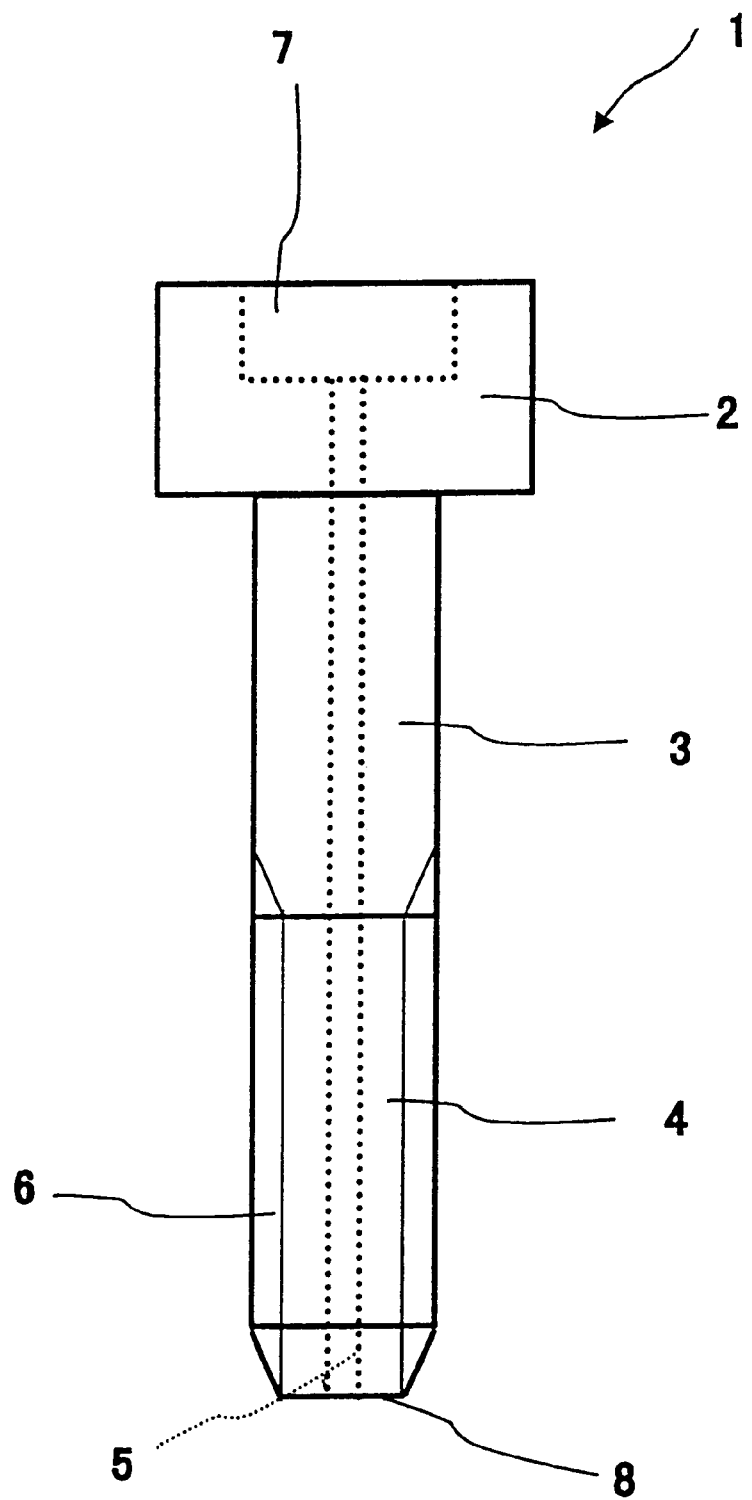
FIG. 5 is a front view which shows one example of a screw which is manufactured according to the manufacturing method of the present invention.

FIG. 1 is a step diagram which shows the steps performed in the screw manufacturing method of the first embodiment of the present invention, and FIG. 5 is a front view which shows one example of a screw which is manufactured according to the manufacturing method of the present invention.

As shown in FIG. 5, a screw 1 manufactured according to this embodiment includes a head portion 2, a tip portion 4 and a shank portion 3 formed between the head portion 2 and the tip portion 4. A hexagon socket is formed in the center part of the head portion 2. A male thread 6 is formed on the outer circumference of the tip portion 4. Further, a hollow axial bore 5 is axially formed along the longitudinal direction of the screw. The base part of the hollow axial bore 5 is opened in the bottom part of the hexagon socket 7, while the tip part of the hollow axial bore 5 is opened at the tip end of the screw. The screws having the structure described above is suitably used under the reduced pressure or vacuum. For example, these screws are suitably used in chambers of vacuum deposition apparatuses, spattering apparatuses and semiconductor manufacturing apparatuses, and the like.

Hereinbelow, a description will be made with regard to the first embodiment of the screw manufacturing method of the present invention.

<1A> Production of Green Body

In this invention, a green body is formed by extrusion molding using a feed stock containing material powder.

In this extrusion molding, the feed stock is supplied into a cylinder and then pressed to extrude it from an orifice of a die (mold), in which the feed stock is successively extruded while the cross-sectional shape thereof is being kept uniformly. This molding method is advantageous in being capable of forming an elongated green body successively.

In this connection, extrusion molding using heated cylinder and die is particularly preferred ,since extrusion resistance of the feed stock can be reduced and therefore the formability thereof is excellent.

Hereinbelow, a detailed description will be made with regard to the production of the green body by means of the extrusion molding.

First, material powder and a binder (organic binder) are prepared, and then they are mixed and then kneaded with a kneading machine to obtain a feed stock.

Examples of the material powder include metal powder and ceramics powder and the like.

No limitation is imposed upon the metal material for the metal powder (hereinbelow, referred to simply as "metal material"). For example, at least one of Fe, Ni, Co, Cr, Mn, Zn, Pt, Au, Ag, Cu, Pd, Al, W, Ti, V, Mo, Nb, Zr and the like; or alloys (mainly) containing at least one of these elements may be used as a constituent material for the metal powder.

According to the present invention, the formability can be improved as described above. Therefore, it is preferable (possible) to use any metal material by which a finally obtained sintered compact can have a relatively high hardness or a finally obtained sintered compact is difficult to be machined. Further, it is also preferable to use metal materials by which the finally obtained sintered compact has corrosion resistance properties against reactive gases used in the semiconductor manufacturing apparatus and the like as well as heat resistance property against high temperature atmosphere. Specific examples of such metal materials include Ni-based alloys (e.g. NCF 600, NCF 690); Fe-based alloys such as stainless steels (e.g., SUS 304, SUS 310S, SUS 316, SUS 317, SUS 329J1, SUS 410, SUS 430, SUS 440 and SUS 630); Ti or Ti-based alloys; W or W-based alloys; Co-based cemented carbides; Ni-based cermets; and the like.

No limitation is imposed upon the mean particle size of the metal powder, but it is preferable that the mean particle size is smaller than 150 μm, and about 0.1 to 60 μm is more preferable. If the mean particle size is too large, there is a case that density of the sintered compact can not be sufficiently improved, depending on other factors.

Further, no limitation is imposed upon the method for producing the metal powder. For example, a water atomization method, a gas atomization method, a reduction method, a carbonyl method, or a grinding method may be used to produce the metal powder. In this embodiment, the metal powder produced by the gas atomization method is particularly preferred. This is because the metal powder produced by the gas atomization method has a substantially spherical particle shape, so that the feed stock has a high fluidity with a relatively small amount of a binder. This makes it possible to choose extrusion condition for the extrusion molding from a wide variety of conditions so that flaws in the obtained sintered compacts can be suppressed, thereby enabling to improve mechanical properties of the sintered compacts (screws).

Next, no limitation is imposed upon the ceramic material for the ceramic powder (hereinbelow, referred to simply as "ceramic material"). For example, it is possible to use oxide ceramics such as $ZrO_2$ (including partially stabilized zirconia), $Y_2O_3$, $Al_2O_3$ and $TiO_2$, or non-oxide ceramics including carbide ceramics such as WC, TiC, ZrC, SiC and $B_4C$ and the like and nitride ceramics such as TiN, AlN, $Si_3N_4$, ZrN and BN and the like. In this case, it is also possible to use mixture of two or more of the ceramics powders.

No limitation is imposed upon the mean particle size of the ceramics powder, but it is preferable that the mean particle size is smaller than 50 μm, and about 0.05 to 40 μm is more preferable. If the mean particle size is too large, there is a case that density of the sintered compact can not be sufficiently improved, depending on other factors.

Further, the method of producing the ceramics powder is not limited to any specific method, and various methods such as grinding, spray pyrolysis, coprecipitation method, glass crystallization method and sol-gel process can be used to obtain the ceramics powder.

Examples of the binder include polyolefines such as polyethylene, polypropylene, ethylene-vinyl acetate copolymer and the like; acrylic resins such as polymethyl methacrylate, polybutyl methacrylate and the like; styrene resins such as polystyrene and the like; various resins such as polyvinyl chloride, polyvinylidene chloride, polyamide, polyester, polyether, polyvinyl alcohol, copolymers of the above and the like; various waxes; paraffin; higher fatty acids (e.g., stearic acid); higher alcohols; higher fatty acid esters; higher fatty acid amides; and the like. These may be used singly or in combinations of two or more.

Plasticizers may also be added. Examples of the plasticizers include phthalic acid esters (e.g., DOP, DEP and DBP), adipic acid esters, trimellitic acid esters, sebacic acid esters and the like. These may be used singly or in combinations of two or more.

In addition to the metal powder (or ceramics powder), binder and plasticizers, various additives such as lubricants, antioxidants, debinding promoters, surface active agents and the like may be added during the kneading process, if required.

The kneading conditions will vary depending on the composition and particle size of the metal powder or ceramics powder to be used, and the composition and amount of the binder and additives to be added. For example, one of the conditions is a kneading temperature of 50 to 250° C. and a kneading time of about 20 to 210 minutes.

Next, the obtained feed stock is undergone extrusion molding using an extruding machine to produce a green body having desired shape and size.

In this case, by using a predetermined extruding die (molding die) to be used in the extrusion molding machine, it is easily possible to produce a green body having a hollow axial bore which extends along the longitudinal direction of the green body. The feed stock that is heated in the cylinder is hardened during passing through the extruding die by appropriately setting a temperature of the cylinder, an temperature of the die (temperature of the mold), an extrusion rate and an extrusion pressure and the like. In this way, it is possible to produce an elongated green body successively. Thus obtained green body is cut into a plurality of pieces each having a predetermined length to obtain a rod-shaped green body.

In this connection, it is to be noted that the shape and size of the rod-shaped green body is determined taking the degree of shrinkage which will occur in the green body in the following debinding and sintering steps into account.

Conditions for the extrusion molding will vary depending on various factors such as composition and particle size of the material powder to be used, and composition and feed stock ratio of the binder to be used. For example, one of the preferable conditions is as follows: the temperature of cylinder is 100–350° C., the temperature of the die is 30–150° C., the extruding rate is 0.1–50 mm/sec, and the extruding pressure is less than 1000 $kgf/cm^2$.

By setting the condition for the extrusion molding as described above, it is possible to carry out desirable molding without giving large load by high temperature and high pressure to the extrusion molding machine.

The content of the powder material contained in the green body is preferably 80–98 wt % and more preferably 85–98 wt %. If the content of the powder material is less than 80 wt %, the degree of shrinkage during sintering the green body is increased, thus leading to lowered dimensional precision. On the other hand, if the content of the powder material exceeds 98 wt %, the content of the binder is relatively reduced and thereby the fluidity during the extrusion molding becomes poor, thus leading to the case where the extrusion molding is impossible or difficult or the case where the composition of the green body is not uniform.

<2A> Machine Working (including thread cutting) for Green Body

The rod-shaped green body which has been obtained in the step 1A described above is undergone machine working (machining process) such as thread cutting process. Specifically, the screw 1 shown in FIG. 5 is formed by means of the following machine working.

The machine working includes thread cutting, punching (formation of the socket 7), grinding and polishing, and the like. Practically, one or more of the punching, grinding and polishing is performed in addition to the thread cutting.

In this connection, it is to be noted that when the screw as shown in FIG. 5 is to be manufactured, the target shape and size of the green body by the machine working is determined taking the degree of shrinkage which will occur in the green body in the following debinding and sintering steps into account.

Hereinbelow, the machine working for the green body will be described in more details.

First, the rod-shaped green body having an uniform diameter is ground by grinding to form a head portion 2 and a small diameter portion including a shank portion 3 and a tip portion 4 having no thread. Then, the tip portion 4 is undergone a thread cutting process by a turning machine or the like to form a thread 6. Further, a hexagon socket 7 is formed in the head portion 2 by punching. In this case, knurling may be carried out for the outer peripheral portion of the head portion 2, if necessary. Further, polishing may be also carried out to remove burr.

In this was, a green body for a screw having a hollow axial bore can be obtained.

In this case, it is preferable that a pitch of the threads is greater than 0.5 mm, and more preferably greater than 1.0 mm. If the pitch of the thread formed on the green body is too small, it becomes difficult to maintain dimensional precision of the thread portion 6 during the following sintering step, which results in poor productivity.

As described above, since the green body which has not yet been sintered is not hard as compared with the sintered compact, it is possible to perform the machine working thereon without difficulty regardless the composition of the material powder, that is machinability thereof is excellent. Accordingly, it is easy to control the shape and size, thereby improving dimensional precision. Further, this is particularly suited for formation of a complex and intricate shape such as thread cutting.

As for examples of screws which can be formed by the method described above, it is possible to mention screws having triangular screw thread such as metric screw thread, inch screw thread, Whitworth screw thread and unified screw thread, taper screw thread and trapezoidal screw thread and the like.

<3A> Debinding Process for Green Body

The green body produced in the step [2A] is then subjected to a debinding treatment (binder removing treatment) to obtain a brown body.

The debinding process is effected by heat treatment under a non-oxidizing atmosphere such as under vacuum or reduced pressure state ($1\times10^{-2}$ to $1\times10^{-6}$ torr, for example), or in an inert gas such as nitrogen gas, argon gas and the like.

In this case, conditions for the heat treatment are preferably about 0.5 to 40 hours at a temperature of about 150 to 750° C., and more preferably about 1 to 24 hours at a temperature of about 250 to 650° C.

Depending on a particular objective (for example, shorter debinding time), the debinding process by the heat treatment may be conducted in multiple steps (stages). In this case, examples include a method in which a debinding treatment for the first half part is carried out at a low temperature and that for the latter half part is carried out at a high temperature, and a method in which a low temperature state and a high temperature state are repeated alternately.

Further, in combination with one of the heat treatment methods described above, pressure in the atmosphere for the debinding treatment may be changed during the debinding treatment in each of the steps (stages). Examples include a method in which the debinding treatment for the first half part is carried out under the reduced pressure (e.g. $1\times10^{-3}$ torr) and that for the latter half part is carried out under usual atmospheric pressure (normal pressure) and a method in which a reduced pressure state and a usual atmospheric pressure state are repeated alternately.

By selecting a combination of the heat treatment method and the pressure changing debinding method described above appropriately, it is possible to carry out the debinding treatment effectively.

The debinding treatment may be carried out by eluating predetermined components contained the binder or additives therefrom with the aid of predetermined solvent (liquids, gases).

<4A>Sintering of Brawn Body

The brown (debound green body) obtained in the above-mentioned manner is then sintered in a sintering furnace to produce a metal sintered compact or ceramics sintered compact.

Diffusion and grain growth of the powder material are caused by sintering, so that crystal grains are created. During the sintering, pores disappear to form a sintered compact which is dense overall, that is, a sintered compact having high density and low porosity.

In the case where the metal composition is Ni or Ni-based alloy, the sintering temperature during sintering is preferably about 950 to 1500° C., and more preferably about 1000 to 1450° C. Further, in the case where the metal composition is Fe or Fe-based alloy, the sintering temperature is preferably about 1000 to 1500° C., and more preferably about 1050 to 1450° C. Furthermore, in the case where the metal composition is Ti or Ti-based alloy, the sintering temperature is preferably about 950 to 1500° C., and more preferably about 1000 to 1450° C.

On the other hand, in the case where the ceramics composition is oxide ceramics, the sintering temperature during sintering is preferably about 1300 to 2000° C., and more preferably about 1400 to 1850° C. In the case where the ceramics composition is carbide ceramics, the sintering temperature is preferably about 1400 to 2150° C., and more preferably about 1500 to 2150° C. Further, in the case where the ceramics composition is nitride ceramics, the sintering temperature is preferably about 1300 to 1900° C., and more preferably about 1400 to 1850° C.

In this connection, it is to be noted that the sintering temperature may be changed (raised or lowered) with the lapse of time within or outside the range described.

When the sintering temperature lies in the range described above, a preferable sintering time is 0.5 to 8 hours and a more preferable sintering time is 1 to 5 hours.

In the case where the material powder is metal powder, sintering atmosphere is not limited to a specific atmosphere, but an atmosphere under reduced pressure (vacuum) or a nonoxidizing atmosphere is preferable. Sintering in such an atmosphere makes it possible to prevent deterioration of characteristics by oxidation of metal from being caused and contributes to lowing porosity of the sintered compact. In this regard, in the case where the material powder is oxide ceramics, it is preferred that sintering is carried out in atmospheric air or an inactive gas atmosphere. Further, in the case where a powder material is carbide ceramics or nitride ceramics, it is preferred that sintering is carried out in an inactive gas atmosphere. This also contributes to lowering porosity of the sintered compact.

In the case where the powder material is metal powder, a preferred sintering atmosphere is a reduced pressure (vacuum) of 1 torr or lower (preferably, $1\times10^{-2}$ to $1\times10^{-6}$ torr), an inert gas (such as nitrogen gas, argon gas and the like) atmosphere of 1 to 760 torr, or a hydrogen gas atmosphere of 1 to 760 torr. Further, in the case where the powder material is oxide ceramics powder, a preferred sintering atmosphere is an inert gas (such as nitrogen gas, argon gas and the like) atmosphere of 1 to 760 torr or atmospheric air of 1 to 760 torr. Furthermore, in the case where the powder material is carbide or nitride ceramics powder, a preferred sintering atmosphere is an inert gas (such as nitrogen gas, argon gas and the like) atmosphere of 1 to 760 torr.

In this connection, the sintering atmosphere may be changed during the sintering process. For example, sintering can be first carried out under reduced pressure (vacuum) of $1\times10^{-2}$ to $1\times10^{-6}$ torr, and then carried out in the inactive gas atmosphere as described above.

Conducting the sintering under the conditions described above contributes to lowering porosity of the sintered compact. In this case, it is preferred that the porosity of the sintered compact is less than 7%, and more preferably less than 5%. Such reduced porosity contributes to higher density of the sintered compact, thereby enabling to obtain high hardness, high dimensional precision and excellent quality in appearance. Further, the reduce porosity prevents occurrence of sintering flaws. In addition, such reduced porosity also makes it possible to carry out sintering effectively in a shorter sintering time, thereby improving productivity in manufacturing sintered compacts.

Alternatively, the sintering may be carried out in two or more stages. For example, the sintering process may involve a first sintering stage and a second sintering stage which is conducted under sintering conditions different from those of the first sintering stage. In this case, the sintering temperature for the second sintering stage may be set to a higher temperature than that for the first sintering stage. In this way, it becomes possible to further improve sintering efficiency and to further reduce porosity.

In this case, the shape and size of the sintered compact (that is, a screw) have been determined and machined taking shrinkage of the green body which would occur during the debinding step and sintering step into account. In one example, the outer diameter of the thread portion 6 is set to be equal to or greater than 3 mm, and preferably to be 5 to 20 mm. This is because if the outer diameter is too small, the strength of the screw is lowered, so that an elongated screw becomes liable to be broken off.

The size of the hollow axial bore formed in the screw has also been determined taking shrinkage of the green body which would occur during the sintering step into account. Although there is no particular limitation to the diameter of the hollow axial bore in the sintered compact, 1.5 mm or less is preferable and 0.3 to 1.3 mm is more preferable. In this case, if the diameter of the hollow axial bore is too large in a screw having relatively small diameter, the thickness of the metal part of the screw becomes thin, thus leading to poor strength.

Further, it is to be noted that the method of the present invention may have other steps depending on particular objectives. Namely, the method may includes a preliminary step coming before the step 1A, an intermediate step coming between the steps 1A and 4A, or a post step coming after the step 4A.

Of course, a secondary machine working such as removing of flashes or shaping or a chemical treatment or the like may be additionally carried out after the step 2A.

Hereinbelow, a description will be made with regard to the second embodiment of the present invention.

Figure 2:
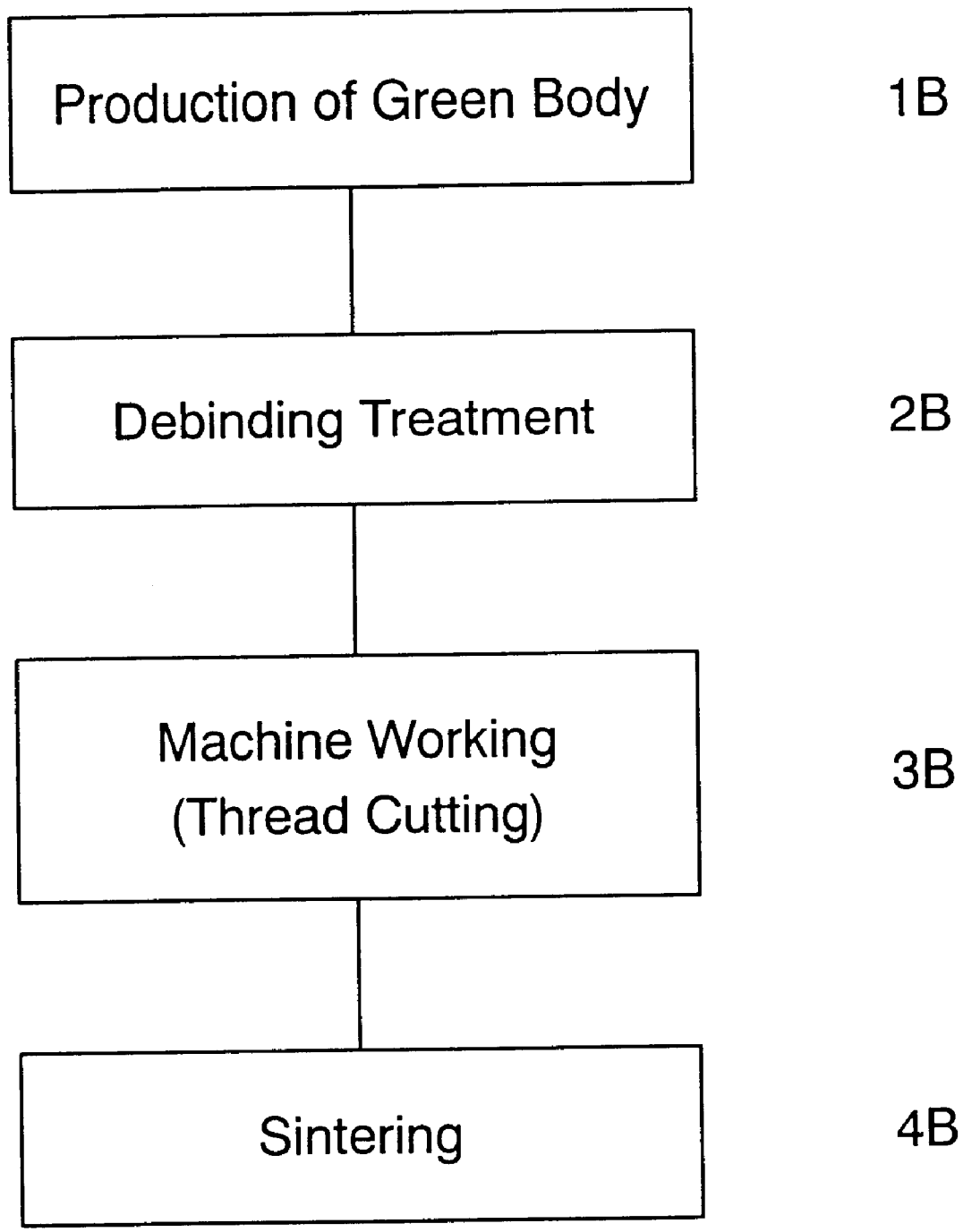
FIG. 2 is a step diagram which shows the steps performed in a second embodiment of the method of manufacturing screws according to the present invention.

FIG. 2 is a step diagram which shows the second embodiment of the screw manufacturing method of the present invention. In this regard, it is the feature of the second embodiment that machine working (machining process) is carried out after the debinding step of the green body. Other steps are the same as those of the first embodiment.

<1B> Production of Green Body
Same as the step 1A described above.

<2B> Debinding Treatment for Green Body
Same as the step 3A described above.

<3B> Machine Working (including thread cutting) for Brown Body

A machine working is carried out onto the green body obtained in the step 2B described above. The kinds of the machine working which are to be made are the same as those described with reference to the step 2A described above.

Since the brown body which has not yet been sintered is not so hard as compared with the sintered compact, it is possible to perform machine working thereon without difficulty regardless the composition of the material powder thereof, that is machinability thereof is excellent. Accordingly, it is easy to control the shape and size of the work piece (brown body), thereby improving dimensional precision. Further, this is particularly suited for formation of a complex and intricate shape such as thread cutting, as compared with the case where machine working is made on a sintered compact.

The kinds of the thread of the screw which can be obtained by this machine working are the same as those described above with reference to the step 2A.

<4A> Sintering of Brown Body
Same as the step 4A described above.

In this connection, it is to be noted that, as is the same with the first embodiment, the method of this second embodiment may have other steps depending on particular objectives. Namely, the method may includes a preliminary step coming before the step 1B, an intermediate step coming between the steps 1B and 4B, or a post step coming after the step 4B.

Further, a secondary machine working such as removing of flashes or shaping or a chemical treatment or the like may be additionally carried out after the step 3B.

Hereinbelow, a description will be made with regard to the third embodiment of the present invention.

Figure 3:
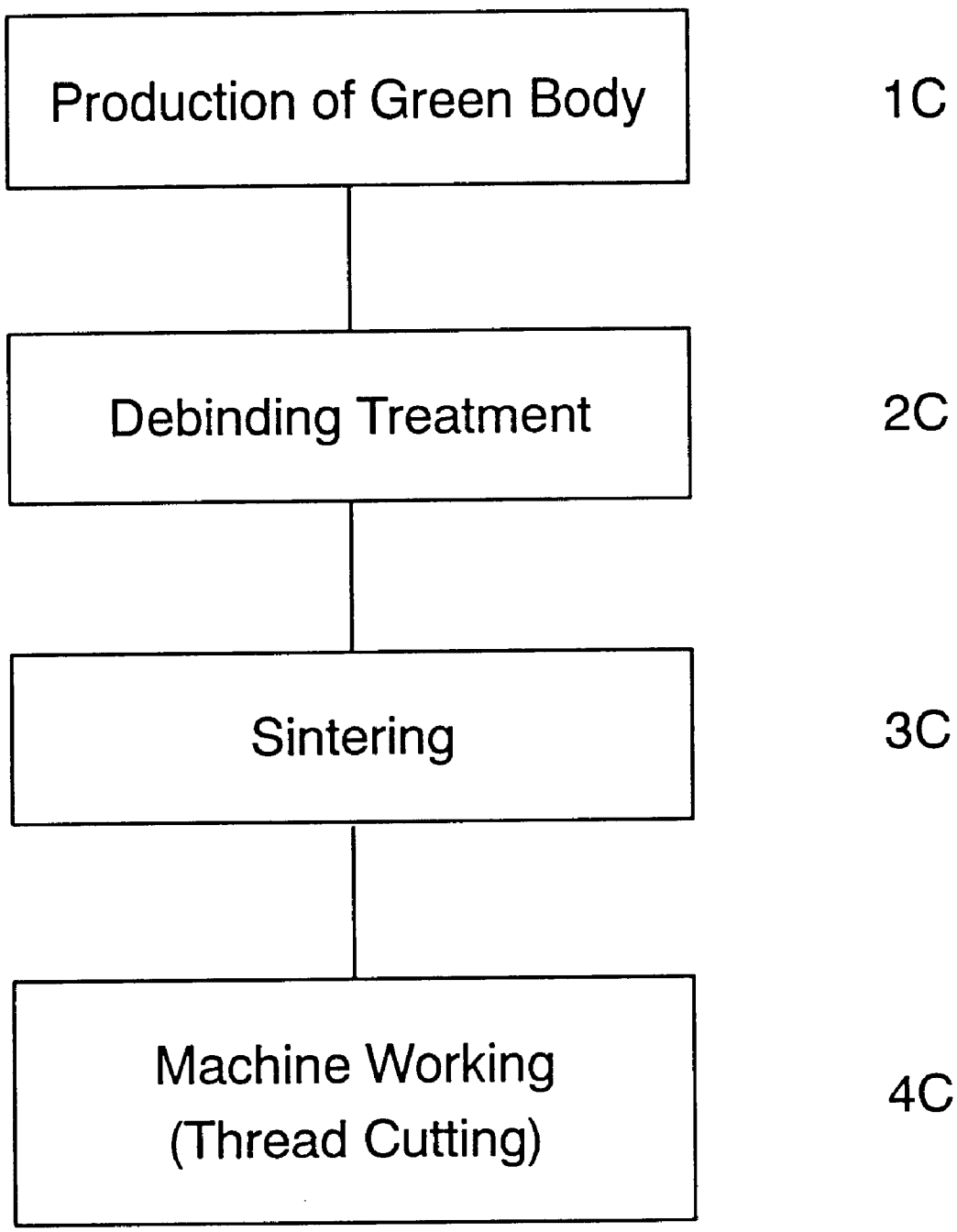
FIG. 3 is a step diagram which shows the steps performed in a third embodiment of the method of manufacturing screws according to the present invention.

FIG. 3 is a step diagram which shows the third embodiment of the screw manufacturing method of the present invention. In this regard, it is the feature of the third embodiment that machine working is carried out after the sintering step of the brown body. Other steps are the same as those of the first embodiment.

<1C> Production of Green Body
Same as the step 1A described above.

<2C> Debinding Treatment for Green Body
Same as the step 3A described above.

<3C> Sintering of Green Body (Brown Body)
Same as the step 4A described above.

<4C> Machine Working (including thread cutting) for Sintered Compact

In this embodiment, machine working including thread cutting is carried out onto the sintered compact obtained in the step 3C described above. The kinds of the machine working which are to be made are the same as those described above with reference to the step 2A.

The sintered compact has high density so that material powder is sufficiently dispersed. Therefore, when machine working is carried out onto such a sintered compact, less changes are caused in shape and dimension of the sintered compact during the machine working as compared with the case where machine working is carried out onto a green body or a brown body. In particular, dimensional deviation in the thread portion 6 becomes small to improve dimensional precision.

The kinds of the thread of the screw which can be obtained by this machine working are the same as those described above with reference to the step 2A.

In this connection, it is to be noted that, as is the same with the first embodiment, the method of this embodiment may have other steps depending on particular objectives. Namely, this method may includes a preliminary step coming before the step 1C, an intermediate step coming between the steps 1C and 4C, or a post step coming after the step 4C.

Further, a secondary machine working such as removing of flashes or shaping or a chemical treatment or the like may be additionally carried out after the step 4C.

Hereinbelow, a description will be made with regard to the fourth embodiment of the present invention.

Figure 4:
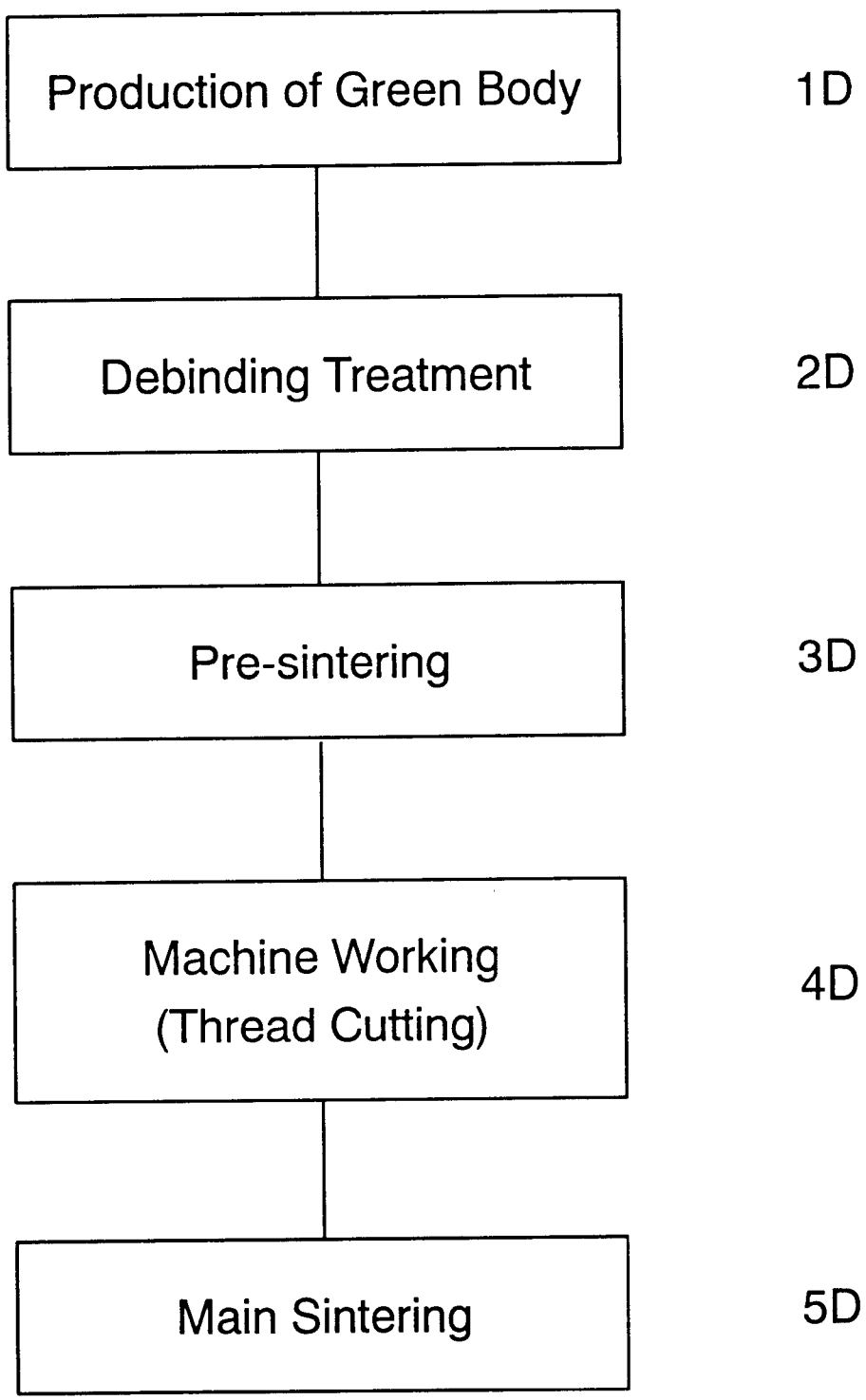
FIG. 4 is a step diagram which shows the steps performed in a fourth embodiment of the method of manufacturing screws according to the present invention.

FIG. 4 is a step diagram which shows the fourth embodiment of the screw manufacturing method of the present invention. In this regard, it is the feature of the fourth embodiment that machine working including thread cutting is carried out onto a pre-sintering compact after a pre-sintering step (preliminary sintering step) of the brown body. Other steps are the same as those of the first embodiment.

<1D> Production of Green Body

Same as the step 1A described above.

<2D> Debinding Treatment for Green Body

Same as the step 3A described above.

<3D> Pre-sintering (Preliminary Sintering) of Brown Body

The brown body produced in the above-mentioned manner is sintered in a sintering furnace to effect pre-sintering, thereby forming a metal pre-sintered compact or a ceramics pre-sintered compact.

In preferred practice, the pre-sintering of the brown body is continued until diffusion bonding occurs among particles of the material powder at least at the points of contact thereof. By conducting such pre-sintering, the shape stability is increased. As a result, it becomes possible to reliably prevent various flaws of the pre-sintered compact such as breaking, chipping, cracking and the like from occurring in the subsequent steps, thus facilitating handling thereof.

In the case where the metal composition is, for example, Ni or Ni-based alloy, the sintering temperature during such a pre-sintering is preferably about 750 to 1300° C., and more preferably about 850 to 1250° C. In the case where the metal composition is Fe or Fe-based alloy, the sintering temperature is preferably about 700 to 1300° C., and more preferably about 800 to 1250° C. Further, in the case where the metal composition is Ti or a Ti-based alloy, the sintering temperature is preferably about 700 to 1200° C., and more preferably about 800 to 1150° C.

Further, in the case where the ceramics composition is oxide ceramics, the pre-sintering temperature during such pre-sintering is preferably about 800 to 1500° C., and more preferably about 950 to 1350° C. In the case where the ceramics composition is carbide ceramics, the sintering temperature is preferably about 850 to 1500° C., and more preferably about 950 to 1400° C. Further, in the case where the ceramics composition is nitride ceramics, the sintering temperature is preferably about 800 to 1500° C., and more preferably about 950 to 1300° C.

In this connection, it is to be noted that the sintering temperature during the pre-sintering may be changed (raised or lowered) with the lapse of time within or outside the range described.

When the sintering temperature lies in the range described above, a preferable sintering time for the pre-sintering is 0.2 to 6 hours and a more preferable sintering time is 0.5 to 4 hours.

In the case where the material powder is metal powder, a sintering atmosphere is not limited to a specific atmosphere, but an atmosphere under reduced pressure (vacuum) or a nonoxidizing atmosphere is preferable. Sintering in such an atmosphere makes it possible to prevent deterioration of characteristics due to oxidation of metal from being caused and contributes to lowing porosity of the sintered compact. Further, in the case where the material powder is oxide ceramics, it is preferred that sintering is carried out in atmospheric air or an inactive gas atmosphere. Further, in the case where the powder material is carbide ceramics or nitride ceramics, it is preferred that sintering is carried out in an inactive gas atmosphere. This also contributes to lowering porosity of the sintered compact.

In the case where the powder material is metal powder, a preferred sintering atmosphere is a reduced pressure (vacuum) of 1 torr or lower (preferably, $1\times10^{-2}$ to $1\times10^{-6}$ torr), an inert gas (such as nitrogen gas, argon gas and the like) atmosphere of 1 to 760 torr, or a hydrogen gas atmosphere of 1 to 760 torr. Further, in the case where the powder material is oxide ceramics, a preferred sintering atmosphere is an inert gas (such as nitrogen gas, argon gas and the like) atmosphere of 1 to 760 torr or atmospheric air of 1 to 760 torr. Furthermore, in the case where the powder material is carbide ceramics or nitride ceramics, a preferred sintering atmosphere is an inert gas (such as nitrogen gas, argon gas and the like) atmosphere of 1 to 760 torr.

In this connection, the sintering atmosphere may be changed during the sintering process. For example, sintering is first carried out under reduced pressure (vacuum) of $1\times10^{-2}$ to $1\times10^{-6}$ torr, and then carried out in the inactive gas atmosphere as described above.

Conducting the sintering under the conditions described above contributes to lowering porosity of the sintered compact, that is high density of the sintered compact.

<4D> Machine Working (including thread cutting) onto Pre-sintered Compact

Machine working is carried out onto the pre-sintered compact. In this case, the kinds of the machine working which are to be carried out are the same as those described above with reference to the step 2A.

The pre-sintered compact is not so hard as compared with the sintered compact, it is possible to perform machine working thereon without difficulty (that is, under good machinability) regardless the composition of the material powder and the kind thereof. Accordingly, it is easy to control the shape and size when manufacturing a screw, thereby improving dimensional precision as compared with the case where a green body or a brown body is machined. Further, as compared with the case where a sintered compact is machined, such a pre-sintered compact is suited for formation of a complex and intricate shape such as thread cutting.

In this connection, it is to be noted that shape and size of the pre-sintered compact machined by this machine working is determined taking shrinkage of the pre-sintered compact during the subsequent main sintering step.

<5D> Secondary Sintering of Brown Body (Main Sintering)

Diffusion and grain growth of the powder material are caused by this main sintering, so that crystal grains are created. During the main sintering, pores disappear to form a sintered compact which is dense overall, that is, a sintered compact having high density and low porosity.

In the case where the metal composition is Ni or Ni-based alloy, the sintering temperature during this main sintering is preferably about 950 to 1500° C., and more preferably about 1000 to 1450° C. Further, in the case where the metal composition is Fe or Fe-based alloy, the sintering temperature is preferably about 1000 to 1500° C., and more preferably about 1050 to 1450° C. Furthermore, in the case where the metal composition is Ti or Ti-based alloy, the sintering temperature is preferably about 950 to 150° C., and more preferably about 1000 to 1450° C. In this regard, it is preferred that the sintering temperature for the main sintering is higher than that for the pre-sintering.

Further, in the case where the ceramics composition is oxide ceramics, the sintering temperature during the main sintering is preferably about 1300 to 2000° C., and -more preferably about 1400 to 1850° C. In the case where the ceramics composition is carbide ceramics, the sintering temperature is preferably about 1400 to 2150° C., and more preferably about 1500 to 2150° C. Further, in the case where the ceramics composition is nitride ceramics, the sintering temperature is preferably about 1300 to 1900° C., and more preferably about 1400 to 1850° C.

In this connection, it is to be noted that the sintering temperature in the main sintering may be changed (raised or lowered) with the lapse of time within or outside the range described.

When the sintering temperature lies in the range described above, a preferable sintering time is 0.5 to 8 hours and a more preferable sintering time is 1 to 5 hours.

In the case where the material powder is metal powder, sintering atmosphere for the main sintering is not limited to a specific atmosphere, but an atmosphere under reduced pressure (vacuum) or a nonoxidizing atmosphere is preferable. Sintering in such an atmosphere makes it possible to prevent deterioration of characteristics by oxidation of metal from being caused and contributes to lowering porosity of the sintered compact. In this regard, in the case where the material powder is oxide ceramics, it is preferred that sintering is carried out in atmospheric air or in an inactive gas atmosphere. Further, in the case where the material powder is carbide ceramics or nitride ceramics, it is preferred that sintering is carried out in an inactive gas atmosphere. This also contributes to lowering porosity of the sintered compact.

In the case where the material powder is metal powder, a preferred sintering atmosphere is a reduced pressure (vacuum) of 1 torr or lower (preferably, $1 \times 10^{-2}$ to $1 \times 10^{-6}$ torr), an inert gas (such as nitrogen gas, argon gas and the like) atmosphere of 1 to 760 torr, or a hydrogen gas atmosphere of 1 to 760 torr. Further, in the case where the powder material is oxide ceramics, a preferred sintering atmosphere is an inert gas (such as nitrogen gas, argon gas and the like) atmosphere of 1 to 760 torr or a hydrogen gas atmosphere of 1 to 760 torr. Furthermore, in the case where the powder material is carbide or nitride ceramics powder, a preferred sintering atmosphere is an inert gas (such as nitrogen gas, argon gas and the like) atmosphere of 1 to 760 torr.

In this connection, the sintering atmosphere may be changed during the sintering process. For example, sintering is first carried out under reduced pressure (vacuum) of $1 \times 10^{-2}$ to $1 \times 10^{-6}$ torr, and then carried out in the inactive gas atmosphere as described above.

Further, the sintering atmosphere for the main sintering process may be different from the sintering atmosphere for the pre-sintering process.

Conducting the sintering under the conditions described above contributes to lowering porosity of the sintered compact, that is high density of the sintered compact, thereby enabling to obtain high dimensional precision. Further, conducing the sintering in separated stages makes it possible to carry out the sintering effectively in a shorter sintering time, thereby improving productivity in manufacturing sintered compacts.

Further, it is to be noted that the method of the present invention may have other steps depending on particular objectives. Namely, the method may includes a preliminary step coming before the step 1D, an intermediate step coming between the steps 1D and 5D, or a post step coming after the step 5D.

Of course, a secondary machine working such as removing of flashes or shaping or a chemical treatment or the like may be additionally carried out after the step 5D.

EXAMPLES

Hereinafter, specific examples of the screw manufacturing method according to the present invention will be described.

Example 1

As for metal powder, Ni alloy (composition: Ni-5Fe-16Cr-16Mo-4w alloy) powder of 10 µm mean particle size was prepared by a gas atomization method.

A binder containing 2.7 wt % of polystyrene (PS), 2.7 wt % of ethylene-vinyl acetate copolymer (EVA) and 2.3 wt % of paraffin wax; and 1.3 wt % of dibutyl phthalate (plasticizer) were mixed with 91 wt % of the prepared metal powder. The mixture containing these components were kneaded by a kneading machine at a temperature of 100° C. for 1 hour to obtain a feed stock.

Next, a green body having a hollow axial bore was formed from the feed stock by extrusion molding, and then thus obtained green body was cut into 50 pieces, in which each piece had an outer diameter of 7.9 mm, an inner diameter of 0.8 mm and a length of 170 mm (whose target dimension after sintering was an outer diameter of 7.0 mm, an inner diameter of 0.7 mm and a length of 150 mm). The molding condition of the extrusion molding was as follows. Temperature of the cylinder was 140° C., temperature of the die was 70° C., the extrusion pressure was 150 kgf/cm², and the extrusion rate was 10 mm/sec.

Then, machine working such as grinding, thread cutting and boring was carried out onto each piece to form a green body having a screw shape.

Then, a debinding treatment was carried out for each green body using a debinding furnace. This debinding treatment was carried out under the conditions of nitrogen atmosphere of 760 torr (normal pressure) at a temperature of 450° C. for 1 hour.

Then, each brown body (debound green body) was sintered using a sintering furnace to obtain a sintered compact. This sintering was carried out under the conditions of an Ar gas atmosphere of 760 torr (normal temperature) at a temperature of 1300° C. for 3 hours.

Example 2

Screws were manufactured in the same manner as in Example 1, except that machine working was carried out onto each brown body.

Example 3

Screws were manufactured in the same manner as in Example 1, except that machine working was carried out onto each sintered compact.

Example 4

Screws were manufactured in the same manner as in Example 1, except that the sintering process was divided into a pre-sintering (preliminary sintering) and a secondary sintering (main sintering), that the pre-sintering was carried out under the conditions of reduced pressure of $1 \times 10^{-4}$ torr at a temperature of 1100° C. for 3 hours and the main sintering was carried out under the conditions of an Ar gas atmosphere of 760 torr (normal temperature) at a temperature of 1280° C. for 2 hours, and that machine working was carried out onto the pre-sintered compact.

Example 5

As for metal powder, a stainless steel (SUS 310S/ composition: Fe-20Ni-25Cr-25 Cr alloy) powder of 8 µm mean particle size was prepared by a gas atomization method.

A binder including 1.8 wt % of polystyrene (PS), 1.8 wt % of ethylene-vinyl acetate copolymer (EVA) and 1.6 wt % of paraffin wax; and 0.8 wt % of dibutyl phthalate (plasticizer) were mixed with 94 wt % of the prepared metal powder. The mixture containing these components were kneaded in a kneading machine under the conditions of 90° C.×1.5 hour to obtain a feed stock.

Next, a green body having a hollow axial bore was formed from the feed stock by extrusion molding, and then thus obtained green body was cut into 50 pieces, in which each piece had an outer diameter of 11.4 mm, an inner diameter of 1.4 mm and a length of 114 mm (whose target dimension after sintering was an outer diameter of 10 mm, an inner diameter of 1.2 mm and a length of 100 mm). The molding condition of the extrusion molding was as follows. Temperature of the cylinder was 140° C., temperature of the die was 70° C., the extrusion pressure was 80 kgf/cm$^2$, and the extrusion rate was 5 mm/sec.

Then, machine working such as grinding, thread cutting and boring was carried out onto each piece to form a green body having a screw shape.

Then, a debinding treatment was carried out for each green body using a debinding furnace. This debinding treatment was carried out under the conditions of a nitrogen atmosphere of 760 torr (normal pressure) at a temperature of 500° C. for 1 hour.

Then, each brown body (debound green body) was sintered using a sintering furnace to obtain a sintered compact. This sintering was carried out under the conditions of an Ar gas atmosphere of 760 torr (normal temperature) at a temperature of 1330° C. for 3 hours.

Example 6

Screws were manufactured in the same manner as in Example 5, except that machine working was carried out onto each brown body.

Example 7

Screws were manufactured in the same manner as in Example 5, except that machine working was carried out onto each sintered compact.

Example 8

Screws were manufactured in the same manner as in Example 5, except that the sintering process was divided into a pre-sintering (preliminary sintering) and a secondary sintering (main sintering), that the pre-sintering was carried out under the conditions of an Ar gas atmosphere of 10 torr at a temperature of 1200° C. for 2 hours and the main sintering was carried out under the conditions of an Ar gas atmosphere of 760 torr (normal temperature) at a temperature of 1310° C. for 2 hours, and that machine working was carried out onto the pre-sintered compact.

Example 9

As for ceramics powder, powder of yttria-partially stabilized zirconia (composition: $ZrO_2$-5.5 wt % $Y_2O_3$) powder of 1 μm mean particle size was prepared by a spray pyrolysis.

A binder including 4.5 wt % of polystyrene (PS), 4.5 wt % of ethylene-vinyl acetate copolymer (EVA) and 3.9 wt % of paraffin wax; and 2.1 wt % of dibutyl phthalate (plasticizer) were mixed with 85 wt % of the prepared ceramics powder. The mixture containing these components were kneaded in a kneading machine under the conditions of 110° C.×1 hour to obtain a feed stock.

Next, a green body having a hollow axial bore was formed from the feed stock by extrusion molding, and then thus obtained green body was cut into 50 pieces, in which each piece had an outer diameter of 9.0 mm, an inner diameter of 1.5 mm and a length of 128.5 mm (whose target dimension after sintering was an outer diameter of 7 mm, an inner diameter of 1.2 mm and a length of 100 mm). The molding condition of the extrusion molding was as follows. Temperature of the cylinder was 140° C., temperature of the die was 70° C., the extrusion pressure was 100 kgf/cm$^2$, and the extrusion rate was 3 mm/sec.

Then, machine working such as cutting, thread cutting and boring was carried out onto each piece to form a green body having a screw shape.

Then, a debinding treatment was carried out for each green body using a debinding furnace. This debinding treatment was carried out under the conditions of a nitrogen atmosphere of 760 torr (normal pressure) at a temperature of 450° C. for 1 hour.

Then, the brown body (debound green body) was sintered using a sintering furnace to obtain a sintered compact. This sintering was carried out under the conditions of an Ar gas atmosphere of 760 torr (normal pressure) at a temperature of 1450° C. for 3 hours.

Example 10

Screws were manufactured in the same manner as in Example 9, except that machine working was carried out onto each brown body.

Example 11

Screws were manufactured in the same manner as in Example 9, except that machine working was carried out onto each sintered compact.

Example 12

Screws were manufactured in the same manner as in Example 9, except that the sintering process was divided into a pre-sintering (preliminary sintering) and a secondary sintering (main sintering), that the pre-sintering was carried out under the conditions of an Ar gas atmosphere of 760 torr (normal pressure) at a temperature of 1000° C. for 3 hours and the main sintering was carried out under the conditions of an Ar gas atmosphere of 760 torr (normal pressure) at a temperature of 1425° C. for 2 hours, and that machine working was carried out onto each pre-sintered compact.

<Evaluation of Qualities and Characteristics>

Each of the sintered compacts of Examples 1 to 12 was cut along various directions, and then the cutting surfaces thereof were visually observed to confirm presence or absence of sintering flaws. The results of this observation were shown in Table 1.

Further, dimensional deviation at the thread portion of each sintered compact of Examples 1 to 12, that is dimensional deviation with respect to the target dimension (average value of 30 pieces in each Example) were measured. The results of this measurement also shown in Table 1.

As shown in Table 1, no sintering flaws were found in the screws of Examples 1 to 12, so that it has been confirmed that the qualities of all of the screws were excellent. Further, it has been also confirmed that the dimensional deviations in the screws of Examples 1 to 12 were small so that they have high dimensional precision.

As described above, according to the present invention, it is possible to form a desired hollow axial bore easily and therefore it is possible to manufacture screws of high density which have excellent machinability and high dimensional precision.

Further, it becomes possible to manufacture screws having complex shapes and provide screws formed of hard materials that were difficult to be machined by the conventional methods, use and function of screws can be expanded.

Finally, it is to be noted that the present invention is not limited to the embodiments and Examples described above, and it is possible to make many changes and modifications within the spirit of the present invention, and therefore the scope of the present invention are determined only by the following claims.

TABLE 1

| Examples | Sintering Flaws | Dimensional Deviation [%] |
|---|---|---|
| Example 1 (Green Body/Thread Cutting) | None | ±0.5 |
| Example 2 (Brown Body/Thread Cutting) | None | ±0.5 |
| Example 3 (Sintered Ccompact/Thread Cutting) | None | ±0.15 |
| Example 4 (Pre-sintered Compact/Thread Cutting) | None | ±0.25 |
| Example 5 (Green Body/Tread Cutting) | None | ±0.5 |
| Example 6 (Brown Body/Thread Cutting) | None | ±0.5 |
| Example 7 (Sintered Compact/Thread Cutting) | None | ±0.15 |
| Example 8 (Pre-sintered Compact/Thread Cutting) | None | ±0.25 |
| Example 9 (Green Body/Thread Cutting) | None | ±0.5 |
| Example 10 (Brown Body/Thread Cutting) | None | ±0.5 |
| Example 11 (Sintered Compact/Thread Cutting) | None | ±0.15 |
| Example 12 (Pre-sintered Compact/Thread Cutting) | None | ±0.25 |

What is claimed is:

1. A method of manufacturing screws which comprises the steps of:
   (A) producing a rod-shaped green body having a hollow axial bore from a feed stock containing material powder by means of extrusion molding;
   (B) debinding the green body to obtain a brown body; and
   (C) sintering the brown body to obtain a sintered compact, wherein at least one machine working including a thread cutting process is carried out at anytime after the completion of the step (A).

2. The method as claimed in claim 1, wherein the machine working including a thread cutting process is carried out between the step (A) and the step (B) onto the green body obtained in the step (A).

3. The method as claimed in claim 1, wherein the machine working including a thread cutting process is carried out between the step (B) and the step (C) onto the brown body obtained in the step (B).

4. The method as claimed in claim 1, wherein the machine working including a thread cutting process is carried out onto the sintered compact obtained in the step (c) after the completion of the step (C).

5. The method as claimed in claim 1, wherein the step (C) includes a plurality of sintering steps.

6. The method as claimed in claim 5, wherein the plurality of sintering steps includes a step for obtaining a pre-sintered compact by pre-sintering the brown body and a step for obtaining a secondary sintered compact by sintering the pre-sintered compact, in which the machine working including a thread cutting process is carried out onto the pre-sintered compact.

7. The method as claimed in claim 1, wherein the diameter of the hollow axial bore after the completion of the sintering step is equal to or less than 1.5 mm.

8. The method as claimed in claim 1, wherein the extrusion pressure of the extrusion molding is equal to or less than 1000 kgf/cm$^2$.

9. The method as claimed in claim 1, wherein the material powder includes metal powder or ceramics powder.

10. The method as claimed in claim 1, wherein the porosity of the sintered compact finally obtained is less than 7%.

11. The method as claimed in claim 1, wherein the screw is adapted to be used under reduced pressure or vacuum.

* * * * *

UNITED STATES PATENT AND TRADEMARK OFFICE
CERTIFICATE OF CORRECTION

PATENT NO. : 6,413,472 B1
DATED : July 2, 2002
INVENTOR(S) : Masaaki Sakata and Junichi Hayashi It is certified that error appears in the above-identified patent and that said Letters Patent is hereby corrected as shown below:

Column 1,
Line 34, after "vibration" insert -- is --

Column 2,
Line 44, "diving" should be -- dividing --
Line 47, "producticity" should be -- productivity --

Column 6,
Line 12, "an" should be -- a --

Column 7,
Line 8, delete "was"
Line 58, "a" should be -- an --

Column 8,
Line 1, "Brawn" should be -- Brown --
Line 43, "lowing" should be -- lowering --

Column 9,
Line 10, "reduce" should be -- reduced --
Line 45, "includes" should be -- include --

Column 10,
Lines 21 and 62, "includes" should be -- include --

Column 11,
Line 60, "lowing" should be -- lowering --

Column 12,
Line 58, "150° C" should be -- 1500°C --

Column 13,
Line 17, "lowing" should be -- lowering --
Line 51, "conducing" should be -- conducting --
Line 56, "includes" should be -- include --

Column 14,
Lines 36 and 57, "temperature" should be -- pressure --

UNITED STATES PATENT AND TRADEMARK OFFICE
CERTIFICATE OF CORRECTION

PATENT NO. : 6,413,472 B1
DATED : July 2, 2002
INVENTOR(S) : Masaaki Sakata and Junichi Hayashi It is certified that error appears in the above-identified patent and that said Letters Patent is hereby corrected as shown below:

<u>Column 15,</u>
Lines 29 and 51, "temperature" should be -- pressure --

<u>Column 17,</u>
Line 21, "Ccompact" should be -- Compact --
Line 24, "Tread" should be -- Thread --

Signed and Sealed this

Eleventh Day of February, 2003

JAMES E. ROGAN
*Director of the United States Patent and Trademark Office*